April 20, 1926.　　　　　　　　　　　　　　　　1,581,454
J. S. LARSON
FLUID PRESSURE REGULATOR
Filed Oct. 17, 1922　　　2 Sheets-Sheet 1
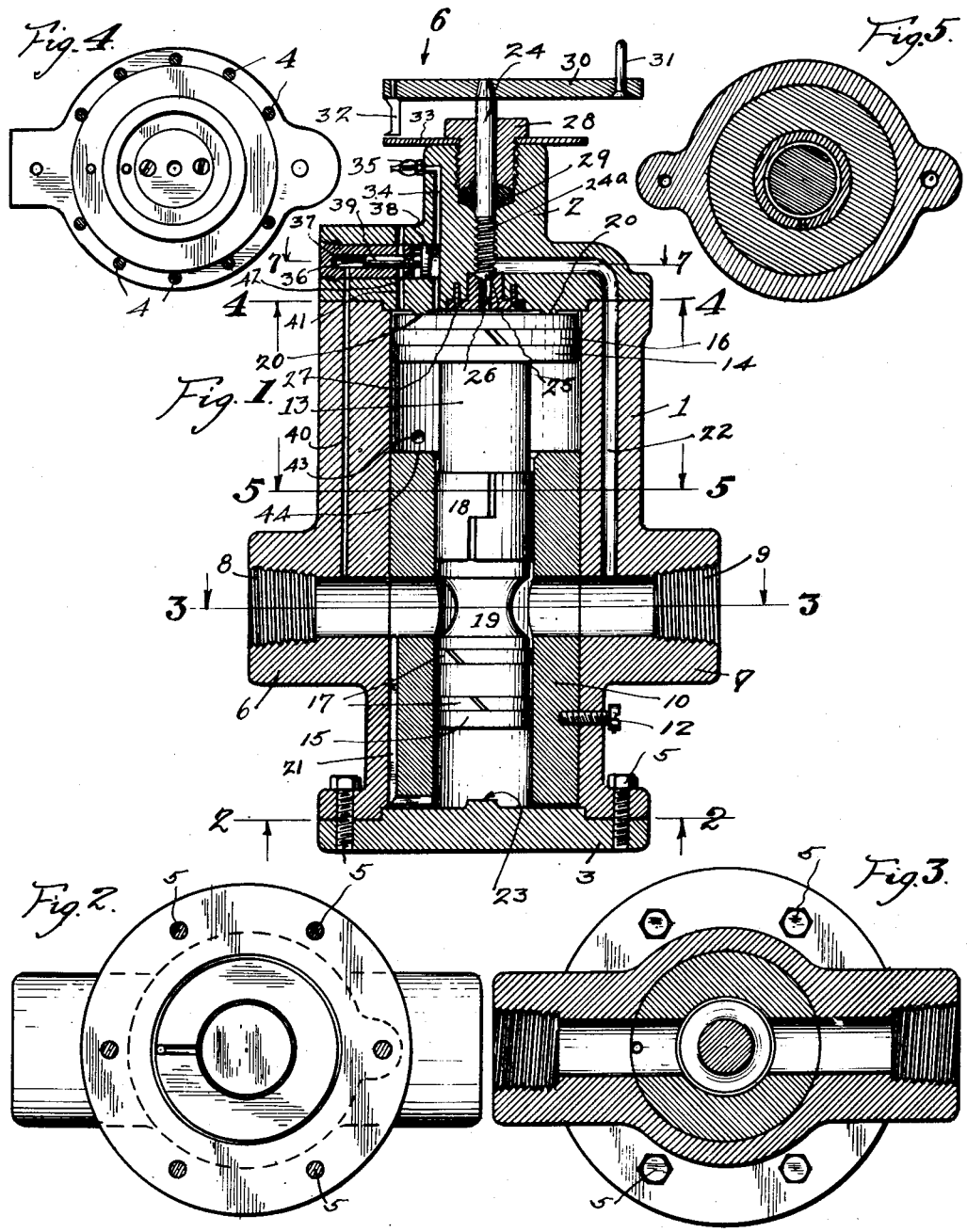
Inventor:
J. Sigfrid Larson April 20, 1926.  1,581,454

J. S. LARSON

FLUID PRESSURE REGULATOR

Filed Oct. 17, 1922  2 Sheets-Sheet 2

Inventor:
J Sigfrid Larson by  Atty.

Patented Apr. 20, 1926.

1,581,454

UNITED STATES PATENT OFFICE.

J SIGFRID LARSON, OF PORTLAND, OREGON.

FLUID-PRESSURE REGULATOR.

Application filed October 17, 1922. Serial No. 595,181.

*To all whom it may concern:*

Be it known that I, J SIGFRID LARSON, a subject of the King of Sweden, and a resident of Portland, county of Multnomah, and State of Oregon, have invented a new and useful Improvement in Fluid-Pressure Regulators, of which the following is a specification.

My invention relates to fluid reducing means which reduce the pressure in a line a predetermined amount in relation to the pressure at the source.

One of the main objects of my invention is to provide a springless device which will regulate fluid and maintain the same at a reduced pressure by balancing the valve between the opposed pressures of said fluid and the increase on one side of the valve positioning the valve and effecting the flow of pressure relatively to the position of the latter.

I have embodied these and other features in a fluid pressure regulator comprising a casing adapted for being connected with a head of fluid, a plurality of hollow cylinders, a piston-valve in each cylinder, each cylinder connected at one end with said casing and having a duct from the latter to its opposite end, a fluid outlet from the latter end of the cylinder, and means for adjusting the openings of the fluid inlet and the fluid outlet at said opposite end of the cylinder relatively to each other, thereby to adjust the pressure on one side of the piston valve relatively to the desired position of the latter.

These and other objects are attained in the device shown in the accompanying drawings, in which:

Fig. 1 is a longitudinal section of my reducing valve and shows that when the pressure is relieved from the upper piston the valve allows steam to pass from the inlet side to the outlet uninterrupted;

Fig. 2 is an end elevation taken on the line 2—2 of Fig. 1;

Fig. 3 is a sectional view taken on the line 3—3 of Fig. 1;

Fig. 4 is a section taken on the line 4—4 of Fig. 1;

Fig. 5 is a section taken on the line 5—5 of Fig. 1;

Figure 6:
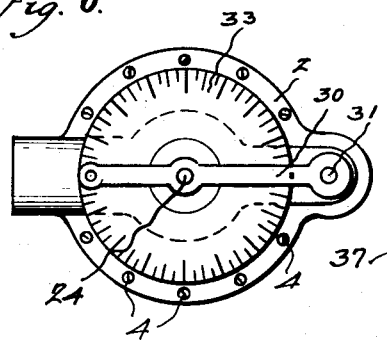
Fig. 6 is an end elevation of the device looking in the position of the arrow 6 in Fig. 1 and shows the graduate scale on the adjusting mechanism.
Figure 7:
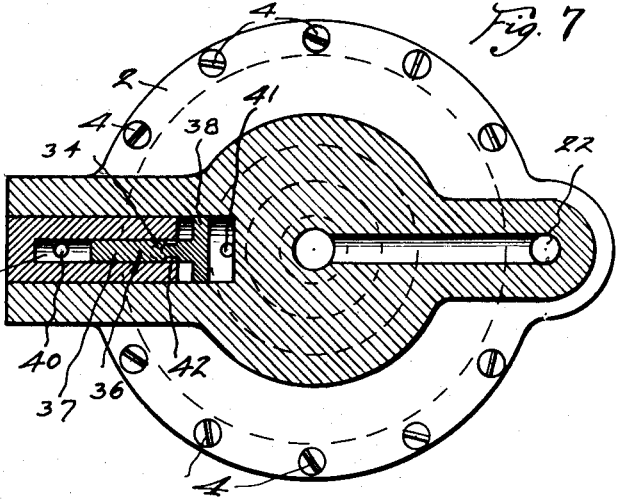
Fig. 7 is a sectional view taken on the line 7—7 of Fig. 1 and shows a section thru the balance valve.
Figure 9:
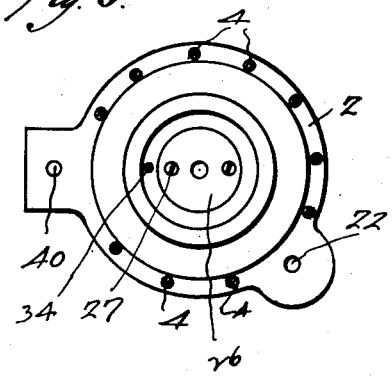
Fig. 9 is a view similar to Fig. 4 of the arrangement necessary to cooperate with the device shown in Fig. 8.
Figure 8:
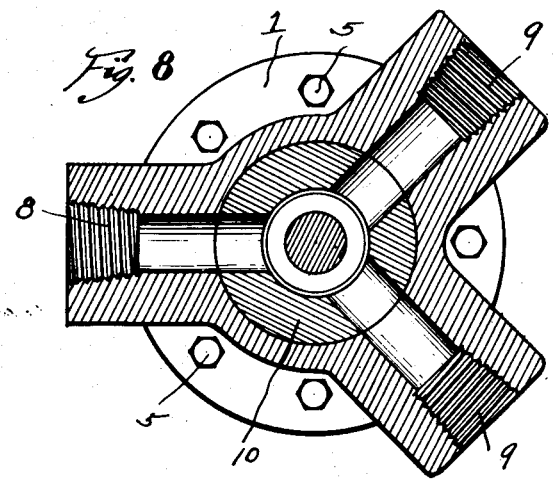
Fig. 8 is a sectional view of a device with two outlets taken on the line similar to the section 3—3 of Fig. 1.

My pressure reducing valve is made up of a body 1, a head 2 and a bottom cap 3. The head 2 is held to the body 1 by cap screws 4 and the bottom cap is held to the body by cap screws 5. The body has two bosses 6 and 7, the boss 6 housing the intake port 8 and the boss 7 housing the outlet port 9. A wearing sleeve 10 is fitted inside of the bore of the body 1 and is fastened to the body by cap screw 12. This screw prevents the sleeve from moving relatively to the body. A double ended piston 13 operates within the body 1 having a large piston head 14 and a smaller piston head 15. The larger piston head 14 bears against the bore of the body 1 and the smaller head 15 bears in the bore of the sleeve 10. Piston head 14 is provided with a piston ring 16 and the smaller piston head 15 is provided with piston rings 17. A wide flat piston ring 18 is also fitted to the shank of the piston between the two heads. A groove 19 encircles the shank of the piston and is positioned so that it matches with the inlet and outlet ports when the larger piston is at the top of its stroke and in its most upward position. It can thus be seen that when the piston is resting against the bosses 20 in the piston head 2 fluid is allowed to pass freely thru the valve by the groove 19 in the piston. A connection 21 is provided between the inlet port 8 and the space under the smaller piston head 15 so that the pressure of the fluid on the intake side will act against the piston head 15 and a similar connection 22 is provided between the outlet port and the space under the larger piston head 14. A boss 23 on the bottom cap 3 prevents the piston head 15 from sealing the entrance from the connection 21 performing a similar function to the bosses 20 on the head. A screw 24 with a tapered end 25 is mounted on the head 2 and the tapered end 25 seats in the removable piece 26 so as to control the fluid passing thru the connection 22. The removable seat 26 is held in position by screws 27. The screw 24 is threaded as at 24ª and rotates in the head 2. It is packed by the stuffing nut 28 which holds the packing material 29 tightly around the screw. It is turned by a handle 30 which has a grip 31 and an indicating finger 32. This indicating finger moves over a circular calibrated section 33 and indicates the relative pressures on the outlet side of my device. The head is also tapped by a connection 34 which is controlled by a pet cock 35. The operation of the valve is as follows:

Steam entering thru the inlet port 8 is at boiler pressure less the pressure lost thru the friction and other causes. It enters the valve and passes down the connection 21 which forces the valve 15 upward and causes the groove 19 to match up and form a connection between the inlet and outlet ports. The fluid then passes directly thru the outlet port 9 and also to the connection 22. The connection 22 is controlled however, by the screw 24 seated in the removable piece 25 and thus only a limited portion of the steam is allowed to pass. The steam is allowed to pass thru and against the cylinder 14 and is also allowed to pass out thru the outlet 34 to the atmosphere. The steam which produces effective pressure on the piston head 14 is therefore the amount of steam which does not pass thru the connection 34 out to the atmosphere and thus the pressure against the piston head 14 is adjustably controlled by the relative cross sectional areas of the inlet opening 22 and outlet connection 34.

The piston head 14 being considerably larger in area than the piston head 15 will force the piston down with considerably less total pressure. As soon as the pressure against the piston head 14 becomes greater than the pressure against the piston head 15 the double acting piston will be forced downward cutting off part of the connection between the inlet and outlet ports and the piston will stay so that it will produce enough pressure to balance this valve. As the demand is increased, of course the valve will rise slightly to accommodate this demand, and if the demand falls the valve will shut down and decrease the supply. The controlling feature of the valve, as stated before, is merely the difference in cross sectional area between the inlet under the tapered portion 25 of the screw 24 and the piece 26 and the area of the outlet connection 34 as controlled by the pet cock 35. By placing the pet cock 35 in the connection 34 both of these connections can be controlled and thus the area of the connection 34 can be reduced or increased so that the indicating finger 32 will record correctly on the calibrated scale 33.

A balancing valve 36 is mounted in the recess 37 of the head 2 and consists of a double acting piston with piston heads which correspond to the proportional sizes of the piston heads 14 and 15.

The larger piston head 38 receives pressure thru the connection 34 and the smaller piston head 39 receives pressure thru the connection 40 which is tapped to the inlet side of the valve. An auxiliary connection 41 is tapped from the bore of the body 1 over the piston head 14 and is tapped to the atmosphere. A groove 42 in the shank of the piston 36 controls this opening in the connection 41. When the pressure in the connection 41 overcomes the pressure in the connection 40 the groove 42 matches with the connection 41 and allows the pressure over the piston head 14 to escape, but when the pressure in the connection 40 is relatively greater than the one in 34 the piston is thrown to its other position and cuts off this connection and prevents fluid from escaping except thru the connection 34.

A hole 43 is drilled thru the body adjacent the top 44 of the sleeve 10 and is adapted to allow the air under the piston head 14 to escape to the atmosphere.

I claim:

1. In a fluid pressure regulating valve of the character described, a valve chamber provided with alined inlet and outlet ports through its sides, for the actuating fluid, a main piston of uniform cross section reciprocating in said chamber, adapted to cut off said ports simultaneously, said piston provided with a peripheral recess adapted to permit the passage of the operating fluid through said ports, and ducts connecting said inlet port and said outlet port with the opposite ends of said valve chamber, one of said ducts being valve controlled and that end of said chamber also provided with a valve controlled outlet.

2. In a fluid pressure regulating valve of the character described, a valve chamber provided with alined inlet and outlet ports through its sides, for the actuating fluid, a main piston of uniform cross section reciprocating in said chamber, adapted to cut off said ports simultaneously, said piston provided with a peripheral recess, adapted to permit the passage of the operating fluid through said ports, ducts connecting said inlet port and said outlet port with the opposite ends of said valve chamber, one of said ducts being valve controlled and that end of said chamber also provided with a valve controlled outlet, and an auxiliary outlet from that end of said valve chamber and a valve controlling the latter outlet adapted to be opened by a predetermined fluid pressure in that end of said chamber.

3. In a fluid pressure regulating valve of the character described, a valve chamber provided with alined inlet and outlet ports through its sides, for the actuating fluid, a main piston of uniform cross section reciprocating in said chamber, adapted to cut off said ports simultaneously, said piston provided with a peripheral recess of substantial equal cross section to said inlet and said outlet ports, adapted to permit the passage of the operating fluid through said ports, and ducts connecting said inlet port and said outlet port with the opposite ends of said valve chamber, one of said ducts being valve controlled and that end of said chamber also provided with a valve controlled outlet.

4. In a fluid pressure regulating valve of the character described, a valve chamber provided with alined inlet and outlet ports through its sides, for the actuating fluid, a main piston of uniform cross section reciprocating in said chamber, adapted to cut off said ports simultaneously, said piston provided with a peripheral recess adapted to permit the passage of the operating fluid through said ports, an enlargement at one end of the valve chamber, an enlarged piston head carried by said piston in said enlargement, and ducts connecting said inlet port and said outlet port with the opposite ends of said valve chamber, one of said ducts being valve controlled and that end of said chamber also provided with a valve controlled outlet.

5. A fluid pressure regulating valve of the character described, the combination of a valve chamber provided with alined inlet and outlet ports through its sides, for the actuating fluid, a main piston of uniform cross section reciprocating in said chamber, adapted to cut off said ports simultaneously, said piston provided with a peripheral recess of substantially equal cross section to said inlet and said outlet ports, adapted to permit the passage of the operating fluid through said ports, ducts connecting said inlet port and said outlet port with the opposite ends of said valve chamber, one of said ducts being valve controlled and that end of said chamber also provided with a valve controlled outlet.

J SIGFRID LARSON.